United States Patent
Park et al.

(10) Patent No.: US 11,405,081 B2
(45) Date of Patent: Aug. 2, 2022

(54) METHOD FOR PERFORMING MU-MIMO BEAMFORMING TRAINING IN WIRELESS LAN SYSTEM, AND METHOD AND DEVICE FOR SUPPORTING MU-MIMO BEAMFORMING TRAINING

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 16/634,873

(22) PCT Filed: Jul. 23, 2018

(86) PCT No.: PCT/KR2018/008265
§ 371 (c)(1),
(2) Date: Jan. 28, 2020

(87) PCT Pub. No.: WO2019/022450
PCT Pub. Date: Jan. 31, 2019

(65) Prior Publication Data
US 2020/0382185 A1 Dec. 3, 2020

Related U.S. Application Data
(60) Provisional application No. 62/537,970, filed on Jul. 28, 2017.

(51) Int. Cl.
*H04B 7/06* (2006.01)
*H04B 7/0452* (2017.01)
(Continued)

(52) U.S. Cl.
CPC ......... *H04B 7/0613* (2013.01); *H04B 7/0452* (2013.01); *H04B 7/0695* (2013.01);
(Continued)

(58) Field of Classification Search
CPC .. H04B 7/0613; H04B 7/0452; H04B 7/0695; H04B 7/088; H04B 7/0417;
(Continued)

(56) References Cited

U.S. PATENT DOCUMENTS

2016/0087695 A1    3/2016  Wang
2016/0323755 A1   11/2016  Cordeiro et al.
(Continued)

FOREIGN PATENT DOCUMENTS

| CN | 103052085 | 4/2013 | |
|---|---|---|---|
| CN | 106716864 | 5/2017 | |
| WO | WO-2018165554 A1 * | 9/2018 | .......... H04W 74/006 |

OTHER PUBLICATIONS

PCT International Application No. PCT/KR2018/008265, Written Opinion of the International Searching Authority dated Nov. 28, 2018, 19 pages.
(Continued)

*Primary Examiner* — Joshua Kading
(74) *Attorney, Agent, or Firm* — Lee, Hong, Degerman, Kang & Waimey PC

(57) ABSTRACT

The present invention relates to a method for performing MU-MIMO beamforming training, the method comprising: receiving a MIMO beamforming setup frame including identification information of a station participating in MU-MIMO beamforming training, in an MU-MIMO beamforming setup subphase; receiving a BRP frame in an MU-MIMO beamforming training subphase; and performing MU-MIMO beamforming training using the BRP frame, if the identification information of the station included in the
(Continued)

MIMO beamforming setup frame responds to the STA and a TA field and an RA field of the BRP frame are the same as a MAC address of an initiator that has transmitted the MIMO beamforming setup frame.

10 Claims, 15 Drawing Sheets

(51) Int. Cl.
  *H04B 7/08* (2006.01)
  *H04L 101/622* (2022.01)
  *H04L 61/50* (2022.01)
  *H04W 84/12* (2009.01)

(52) U.S. Cl.
  CPC ............ *H04B 7/088* (2013.01); *H04L 61/20* (2013.01); *H04L 61/6022* (2013.01); *H04W 84/12* (2013.01)

(58) Field of Classification Search
  CPC ... H04B 7/0491; H04L 61/20; H04L 61/6022; H04W 84/12
  See application file for complete search history.

(56) References Cited

U.S. PATENT DOCUMENTS

| | | | |
|---|---|---|---|
| 2017/0078008 A1 | 3/2017 | Kasher et al. | |
| 2017/0085306 A1* | 3/2017 | Cariou | H04B 7/0452 |
| 2017/0126303 A1 | 5/2017 | Jo et al. | |
| 2017/0317727 A1* | 11/2017 | Wang | H04B 7/0617 |
| 2019/0068258 A1* | 2/2019 | Oteri | H04B 7/0617 |
| 2019/0068271 A1* | 2/2019 | Lou | H04B 7/0684 |
| 2020/0099428 A1* | 3/2020 | Ciochina | H04B 7/0456 |
| 2021/0084635 A1* | 3/2021 | Oteri | H04L 5/0055 |

OTHER PUBLICATIONS

Fujio, S. et al., "CR on MIMO phase in MU-MIMO Beamforming," IEEE P802.11 Wireless LANs, doc.: IEEE 802.11-17/0424r0, Mar. 2017, 4 pages.

Huang, L. et al., "Comment Resolution on MIMO BF Setup," IEEE P802.11 Wireless LANs, doc.: IEEE 802.11-17/0921r4, Jun. 2017, 8 pages.

Huang, L. et al., "Comment Resolution on SU/MU-MIMO BF Training and Feedback," IEEE P802.11 Wireless LANs, doc.: IEEE 802.11-17/1041r0, Jul. 2017, 15 pages.

Cordeiro, C. et al., "MU MIMO beamforming protocol proposal," doc.: IEEE 802.11-16/1365r0, Nov. 2016, 23 pages.

Park et al., "Signaling for MU-MIMO BF Training", doc.: IEEE 802.11-17/1659r0, XP068122380, Nov. 2017, 3 pages.

European Patent Office Application Serial No. 18839258.3, Search Report dated Jun. 26, 2020, 9 pages.

The State Intellectual Property Office of the People's Republic of China Application Serial No. 201880057670.3, Office Action dated Jul. 12, 2021, 7 pages.

* cited by examiner

| CH 1 | L - STF | L - CE | L - Header | ay Header A | ay STF | ay CE | ay Header B | ay payload |
|---|---|---|---|---|---|---|---|---|
|  | GF-STF | GF-CE |  |  |  |  |  |  |
| CH 2 | L - STF | L - CE | L - Header | ay Header A |  |  |  |  |

(L: Legacy, GF: gap filling), ay: 802.11ay)

FIG. 17

| Field | Number of bits | Start bits | Description |
|---|---|---|---|
| SU/MU Format | 1 | 0 | - |
| FDMA Format | 1 | 1 | Indicates whether the MU PPDU is non-FDMA or FDMA. Set to 0 to indicate non-FDMA and set to 1 otherwise |
| Channel Aggregation | 1 | 2 | - |
| BW | 8 | 3 | - |
| Primary Channel Number | 3 | 11 | - |
| Short/Long LDPC | 1 | 14 | - |
| STBC Applied | 1 | 15 | - |
| SS Descriptor Set 0 | 9 | 16 | Describes the SS assignment to the first STA addressed within the MU PPDU. |
| SS Descriptor Set 1 | 9 | 25 | Describes the SS assignment to the second STA addressed within the MU PPDU. |
| SS Descriptor Set 2 | 9 | 34 | Describes the SS assignment to the third STA addressed within the MU PPDU. |
| SS Descriptor Set 3 | 9 | 43 | Describes the SS assignment to the fourth STA addressed within the MU PPDU. |
| SS Descriptor Set 4 | 9 | 52 | Describes the SS assignment to the fifth STA addressed within the MU PPDU. |
| SS Descriptor Set 5 | 9 | 61 | Describes the SS assignment to the sixth STA addressed within the MU PPDU. |
| SS Descriptor Set 6 | 9 | 70 | Describes the SS assignment to the seventh STA addressed within the MU PPDU. |
| SS Descriptor Set 7 | 9 | 79 | Describes the SS assignment to the eighth STA addressed within the MU PPDU. |
| EDMG TRN Length | 8 | 88 | - |
| RX TRN-Units per Each TX TRN-Unit | 8 | 96 | Describes the SS assignment to the eight STA addressed within the MU PPDU. |
| EDMG TRN-Unit P | 2 | 104 | - |
| EDMG TRN-Unit M | 4 | 106 | - |
| EDMG TRN-Unit N | 2 | 110 | - |
| CRC | 16 | 112 | Header Check sequence. |

METHOD FOR PERFORMING MU-MIMO BEAMFORMING TRAINING IN WIRELESS LAN SYSTEM, AND METHOD AND DEVICE FOR SUPPORTING MU-MIMO BEAMFORMING TRAINING

CROSS-REFERENCE TO RELATED APPLICATIONS

This application is the National Stage filing under 35 U.S.C. 371 of International Application No. PCT/KR2018/008265, filed on Jul. 23, 2018, which claims the benefit of U.S. Provisional Application No. 62/537,970, filed on Jul. 28, 2017, the contents of which are all hereby incorporated by reference herein in their entirety.

TECHNICAL FIELD

The following disclosure relates to a method for performing a Multi User-Multiple Input Multiple Output (MU-MIMO) beamforming training in a Wireless LAN (WLAN) system, method for supporting the MU-MIMO beamforming training, and apparatus therefor.

BACKGROUND ART

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

DISCLOSURE

Technical Task

The present disclosure proposes a method for an initiator to support an MIMO beamforming only for specific responders in an MU-MIMO beamforming training process, method for performing the MIMO beamforming by one of the specific responders based on the same, and apparatus therefor.

Technical Solutions

According to one embodiment, a method of performing a Multi User-Multiple Input Multiple Output (MU-MIMO) beamforming training by a Station (STA) in a Wireless LAN (WLAN) system may include receiving a MIMO beamforming setup frame including station identification information of a station participating in the MU-MIMO beamforming training in a MIMO beamforming setup subphase, receiving a Beam Refinement Protocol (BRP) frame in a MU-MIMO beamforming training subphase, and if the station identification information included in the MIMO beamforming setup frame corresponds to the STA and a Transmitter Address (TA) field and a Receiver Address (RA) field of the BRP frame are identical to a Medium Access Control (MAC) address of an initiator having transmitted the MIMO beamforming setup frame, performing the MU-MIMO beamforming training using the BRP frame.

The station identification information may include group Identifier (ID) information of stations participating in the MU-MIMO beamforming training and identification information of stations participating in the MU-MIMO beamforming training within a group indicated by the group ID information.

The BRP fame may include a Training (TRN) subfield.

The method may further include receiving a MIMO beamforming feedback poll frame requesting MU-MIMO beamforming feedback in a MU-MIMO beamforming feedback subphase and transmitting MU-MIMO beamforming feedback on the performed MU-MIMO beamforming training in response to the MIMO beamforming feedback poll frame.

According to another embodiment, a method of supporting a Multi User-Multiple Input Multiple Output (MU-MIMO) beamforming training by a Station (STA) in a Wireless LAN (WLAN) system may include transmitting a MIMO beamforming setup frame including station identification information of a station participating in the MU-MIMO beamforming training in a MIMO beamforming setup subphase and transmitting a Beam Refinement Protocol (BRP) frame with a Transmitter Address (TA) field and a Receiver Address (RA) field set to a Medium Access Control (MAC) address of the STA in a MU-MIMO beamforming training subphase.

The station identification information may include group Identifier (ID) information of stations participating in the MU-MIMO beamforming training and identification information of stations participating in the MU-MIMO beamforming training within a group indicated by the group ID information.

The BRP fame may include a Training (TRN) subfield.

The method may further include transmitting a MIMO beamforming feedback poll frame requesting MU-MIMO beamforming feedback in a MU-MIMO beamforming feedback subphase and receiving MU-MIMO beamforming feedback on a previously performed MU-MIMO beamforming training from one or more responders in response to the MIMO beamforming feedback poll frame.

According to another embodiment, a station performing a Multi User-Multiple Input Multiple Output (MU-MIMO) beamforming training in a Wireless LAN (WLAN) system may include a transceiver configured to have one or more Radio Frequency (RF) chains and transceive signals with one or more other stations and a processor configured to be connected to the transceiver and process the signals transceived with the one or more other stations, wherein the processor may be further configured to receive a MIMO beamforming setup frame including station identification information of a station participating in the MU-MIMO beamforming training in a MIMO beamforming setup subphase, receive Beam Refinement Protocol (BRP) frame in a MU-MIMO beamforming training subphase, and if the station identification information included in the MIMO beamforming setup frame corresponds to the STA and a Transmitter Address (TA) field and a Receiver Address (RA) field of the BRP frame are identical to a Medium Access Control (MAC) address of an initiator having transmitted the MIMO beamforming setup frame, perform the MU-MIMO beamforming training using the BRP frame.

According to another embodiment, a station supporting a Multi User-Multiple Input Multiple Output (MU-MIMO) beamforming training in a Wireless LAN (WLAN) system may include a transceiver configured to have one or more Radio Frequency (RF) chains and transceive signals with one or more other stations and a processor configured to be connected to the transceiver and process the signals transceived with the one or more other stations, wherein the processor may be further configured to transmit a MIMO beamforming setup frame including station identification information of a station participating in the MU-MIMO beamforming training in a MIMO beamforming setup subphase and transmit a Beam Refinement Protocol (BRP) frame with a Transmitter Address (TA) field and a Receiver Address (RA) field set to a Medium Access Control (MAC) address of the STA in a MU-MIMO beamforming training subphase.

Effects obtainable from the present disclosure are non-limited by the above-mentioned effects. And, other unmentioned effects can be clearly understood from the following description by those having ordinary skill in the technical field to which the present disclosure pertains.

Advantageous Effects

Through the above configuration, an initiator and responder according to the present disclosure may support (or perform) an MIMI beamforming training only for specific responders without the increase of signaling overhead.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The appended drawings of this specification are presented to provide a further understanding of the present disclosure and are incorporated in and constitute a part of this application, illustrate embodiments of the disclosure and serve to explain the principle of the disclosure along with the description of the present disclosure.

FIG. 17 is a diagram showing fields included in an EDMG Header-A field within PPDU for MU applicable to the present disclosure.

BEST MODE FOR DISCLOSURE

Hereinafter, the preferred embodiment of the present disclosure will be described in detail with reference to the appended drawings. The detailed description that will hereinafter be disclosed along with the appended drawings will only be provided to describe an exemplary embodiment of the present disclosure. And, therefore, it should be understood that the exemplary embodiment presented herein will not represent the only embodiment for carrying out the present disclosure.

The following detailed description includes specific details for providing a full understanding of the present disclosure. However, it will be apparent to anyone skilled in the art that the present disclosure can be carried out without referring to the above-mentioned specific details. In some cases, in order to avoid any ambiguity in the concept of the present disclosure, the disclosed structure and device may be omitted, or the disclosed structure and device may be illustrated as a block diagram based on their core functions.

Although diverse mobile communication systems applying the present disclosure may exist, a wireless LAN (WLAN) system will hereinafter be described in detail as an example of such mobile communication system.

1. Wireless LAN (WLAN) System 1-1. General Wireless LAN (WLAN) System

Figure 1:
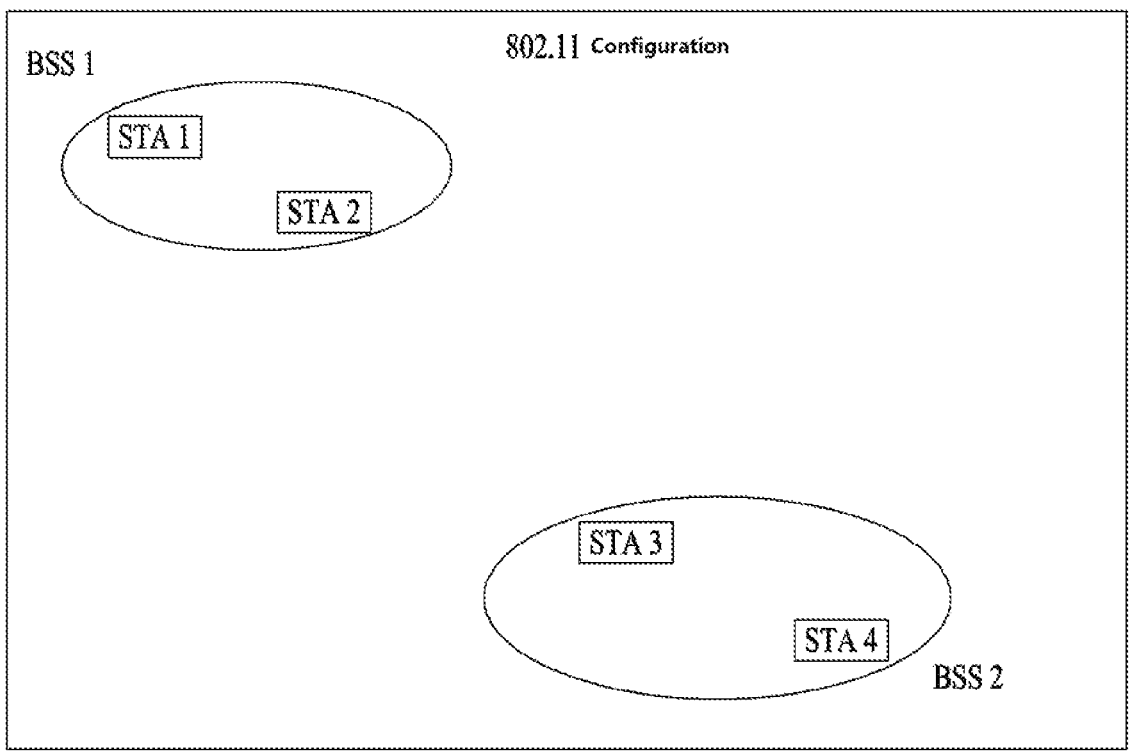
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, a STA includes an access point (AP) and a non-AP Station. Among the STAs, a portable device (or terminal) that is operated by a user corresponds to a non-AP Station. And, therefore, when an entity is simply mentioned to as a STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
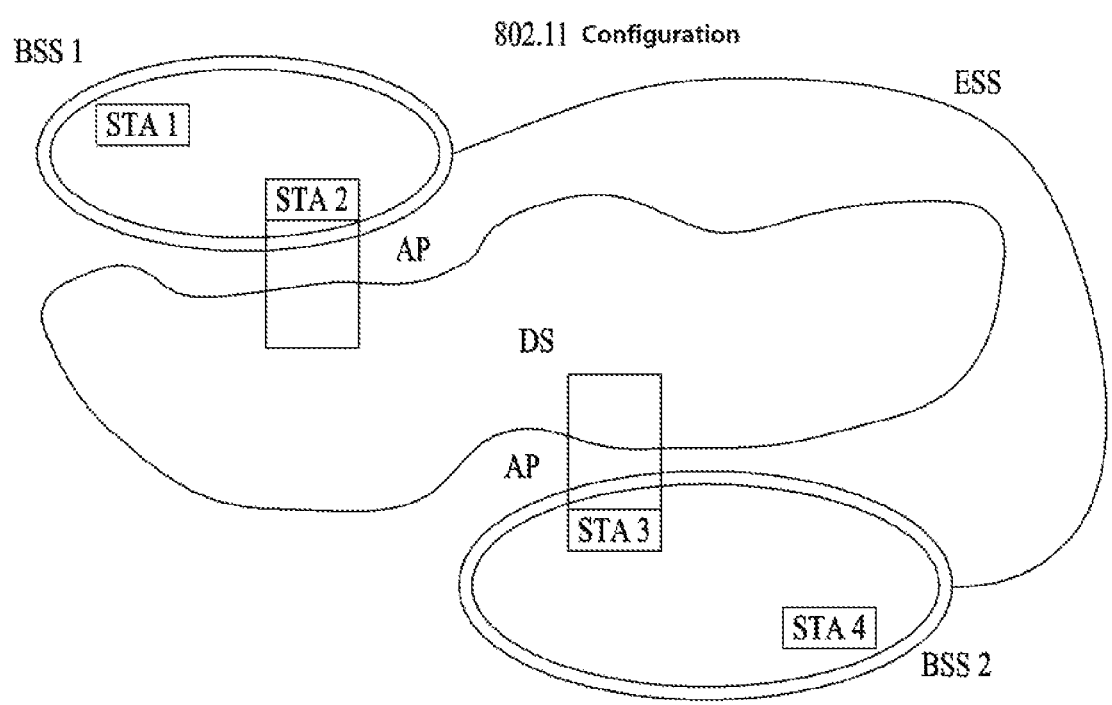
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
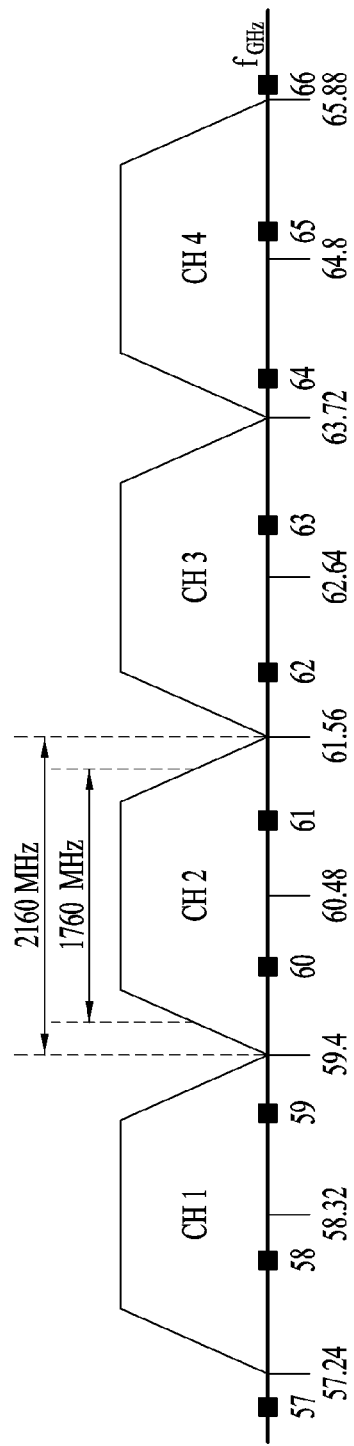
FIG. 3 is a diagram describing a channel in a 60 GHz band for describing a channel bonding operation according to an exemplary embodiment of the present disclosure.

FIG. 3 is a diagram describing a channel in a 60 GHz band for describing a channel bonding operation according to an exemplary embodiment of the present disclosure.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present disclosure will not be limited to only one or more specific channels.

Figure 4:
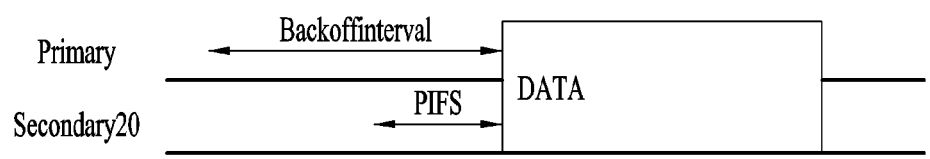
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present disclosure, a solution (or method) for performing scheduling-based access by having the AP transmit scheduling information to the STAs is proposed. Meanwhile, in another aspect of the present disclosure, a solution (or method) for performing contention-based channel access based on the above-described scheduling or independently from the above-described scheduling is proposed. Furthermore, in yet another aspect of the present disclosure, a method for performing communication through a spatial sharing technique based on beamforming is proposed.

1-3. Beacon Interval Configuration

Figure 5:
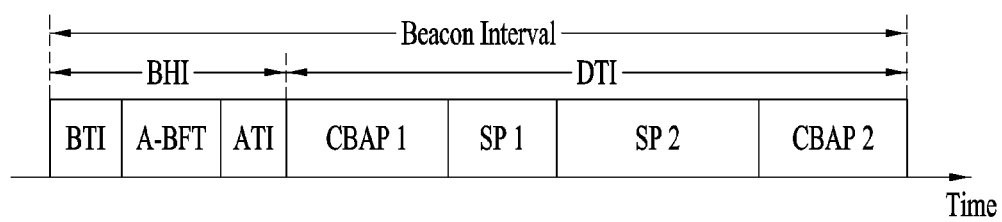
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by a STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2

SPs are allocated to the DCI, this is merely exemplary. And, therefore, the present disclosure is not necessarily required to be limited only to this.

Hereinafter, a physical layer configuration in a wireless LAN (WLAN) system, in which the present disclosure is to be applied, will be described in detail.

1-4. Physical Layer Configuration

It will be assumed that the wireless LAN (WLAN) system according to an exemplary embodiment of the present disclosure may provide 3 different modulations mode as shown below.

TABLE 1

| PHY | MCS | Note |
| --- | --- | --- |
| Control PHY | 0 | |
| Single carrier PHY | 1 ... 12 | (low power SC PHY) |
| (SC PHY) | 25 ... 31 | |
| OFDM PHY | 13 ... 24 | |

Such modulation modes may be used for satisfying different requirements (e.g., high throughput or stability). Depending upon the system, among the modulation modes presented above, only some of the modulation modes may be supported.

Figure 6:
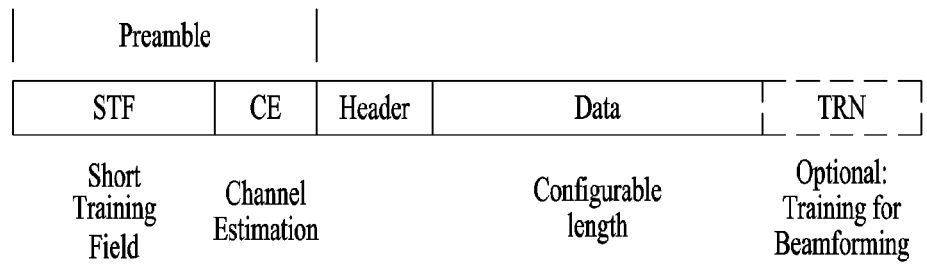
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
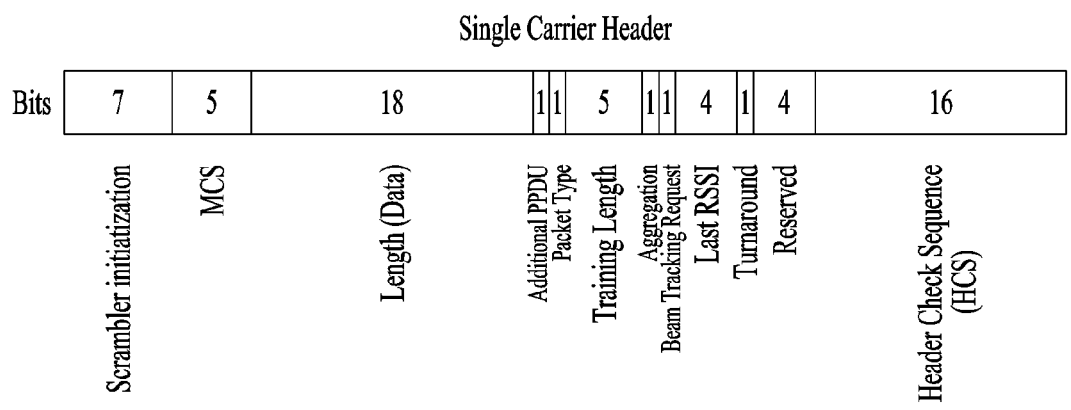
FIG. 7 and FIG. 8 are diagrams describing a configuration of a header field of the radio frame shown in FIG. 6.
Figures 8, 9:
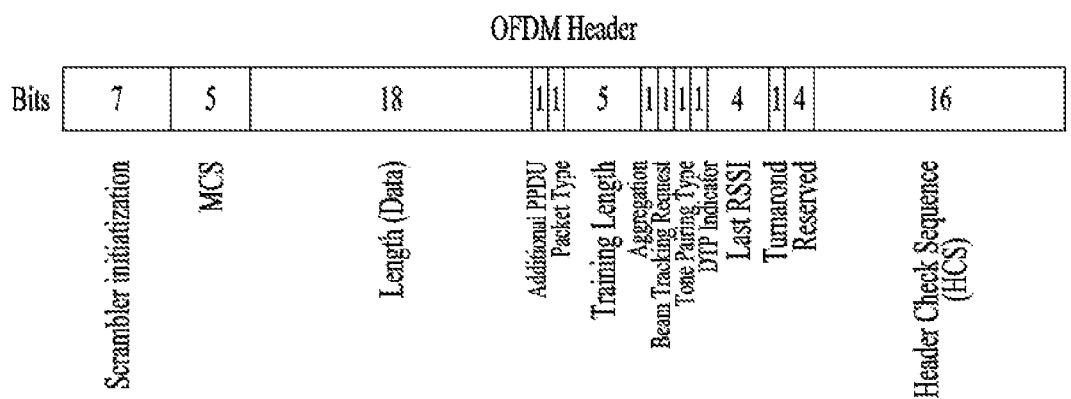
FIG. 9 is a diagram showing a PPDU structure that can be applied to the present disclosure.

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11 ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present disclosure, it may be considered to perform the transmission (gap filling) of a new STF and CE field along with the legacy preamble at the same time through the 400 MHz band between each channel.

In this case, as shown in FIG. 9, the PPDU structure according to the present disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
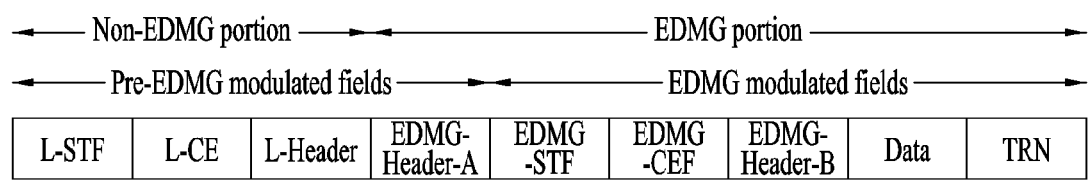
FIG. 10 is a diagram showing a simple PPDU structure that can be applied to the present disclosure.

FIG. 10 is a diagram showing a simple PPDU structure that can be applied to the present disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the above-described PPDU may be used for packet detection, Automatic Gain Control (AGC), frequency offset estimation, synchronization, indication of modulation (SC or OFDM), and channel estimation. A format of the preamble may be common to both OFDM packets and SC packets. Herein, the preamble may be configured of a Short Training Field (STF) and a Channel Estimation (CE) field that is positioned after the STF field.

2. Beamforming Procedure Applicable to the Present Disclosure

As described above, in the 11ay system to which the present disclosure is applicable, methods (e.g., channel bonding, channel aggregation, FDMA, etc.) of transmitting data using a plurality of channels simultaneously are applicable. Particularly, in the 11ay system to which the present disclosure is applicable, as a signal of a high frequency band is utilized, a beamforming operation is applicable in order to transceive signals with high reliability.

Yet, in the related art 11 ad system, a beamforming for a single channel is disclosed only but a beamforming method applicable to a plurality of channels is not mentioned at all. Therefore, in the present disclosure, a beamforming procedure for a channel bonding or aggregation transmission using a plurality of channels is described in detail.

In order to describe a beamforming procedure applicable to the present disclosure, a beamforming training procedure for a single channel is described in detail basically.

Figure 11:
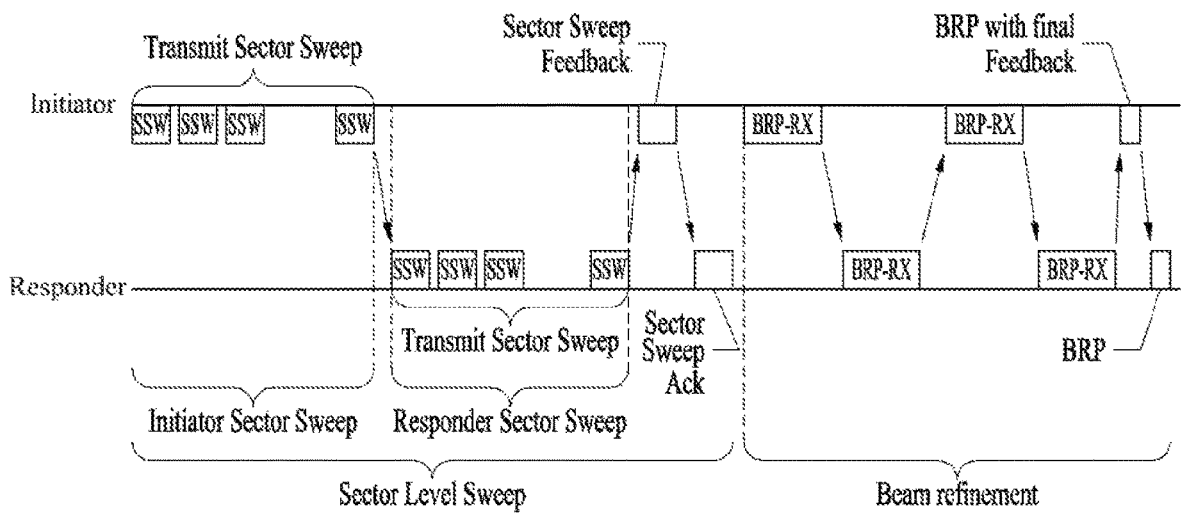
FIG. 11 is a diagram showing one example of a beamforming training process applicable to the present disclosure.

FIG. 11 is a diagram showing one example of a beamforming training process applicable to the present disclosure.

Basically, a beamforming procedure applicable to the present disclosure may mainly include a Sector Level Sweep (SLS) phase and a Beam Refinement Protocol (BRP) or a Beam Refinement Phase (BRP). In this case, the BRP phase may be performed optionally.

In the following, an STA intending to transmit data through a beamforming operation will be referred to as an initiator and an STA receiving the transmitted data from the initiator will be referred to as a responder.

In a BF training occurring within Association-BeamForming Training (A-BFT) assignment, an AP or PCP/AP is an initiator and a non-AP STA or non-PCP/AP STA becomes a responder. In a BF training occurring within SP assignment, a source (EDMG) STA of the SP is an initiator and a destination STA of the SP becomes a responder. In a BF training within Transmission Opportunity (TXOP), a TXOP holder is an initiator and a TXOP responder becomes a responder.

A link to the responder from the initiator will be referred to as an initiator link, and a link to the initiator from the responder will be referred to as a responder link.

On a 60-GHz band supported in the 11ay system to which the present disclosure is applicable, a directional transmission scheme is applicable instead of an omni transmission scheme in order to deliver data, control information and the like with high reliability.

As a process for this, STAs intending to transceive data may be mutually aware of a TX or RX best sector for an initiator and a responder through an SLS process.

Such a BF training starts with a Sector Level Sweep (SLS) from an initiator. An object of an SLS phase is to enable communication between two STAs at a control PHY rate or higher MCS. Particularly, the SLS phase just provides transmitting a BF training only.

In addition, if there is a request from an initiator or responder, the SLS may be followed by a Beam Refinement Protocol (BRP) or a Beam Refinement Phase (BRP).

An object of the BRP phase is to enable a reception training and the iterative refinement of Antenna Weight Vectors (AWVs) of all transmitters and receivers in all STAs. If one of STAs participating in a beam training selects to use a single transmitting antenna pattern, a reception training may be performed as a part of the SLS phase.

The SLS phase is described in detail as follows. The SLS phase may include the four elements in the following: Initiator Sector Sweep (ISS); Responder Sector Sweep (RSS) for training a responder link; SSW feedback; and SSW ACK.

An initiator starts an SLS phase by transmitting frame(s) of ISS.

A responder does not start a transmission of frame(s) of RSS until the ISS is completed successfully. Yet, if ISS occurs within BTI, it may be exceptional.

The initiator does not start SSW feedback until the RSS phase is completed successfully. Yet, if the RSS occurs within A-BFT, it may be exceptional. The responder does not start SSW ACK of the initiator within the A-BFT.

The responder starts the SSW ACK of the initiator right after the successful completion of the SSW feedback of the initiator.

During the SLS phase, BF frames transmitted by the initiator may include an (EDMG) beacon frame, an SSW frame, and an SSW feedback frame. During the SLS phase, BF frames transmitted by the responder may include an SSW frame and an SSW-ACK frame.

During the SLS phase, if each of the initiator and the responder performs a Transmit Sector Sweep (RXSS), each of the initiator and the responder possesses a transmission sector of its own at the end of the SLS phase. If the ISS or RSS employs a receive sector sweep, each of the responder and the initiator possesses a receive sector of its own.

An STA does not change a transmission power during the sector sweep.

Figure 12:
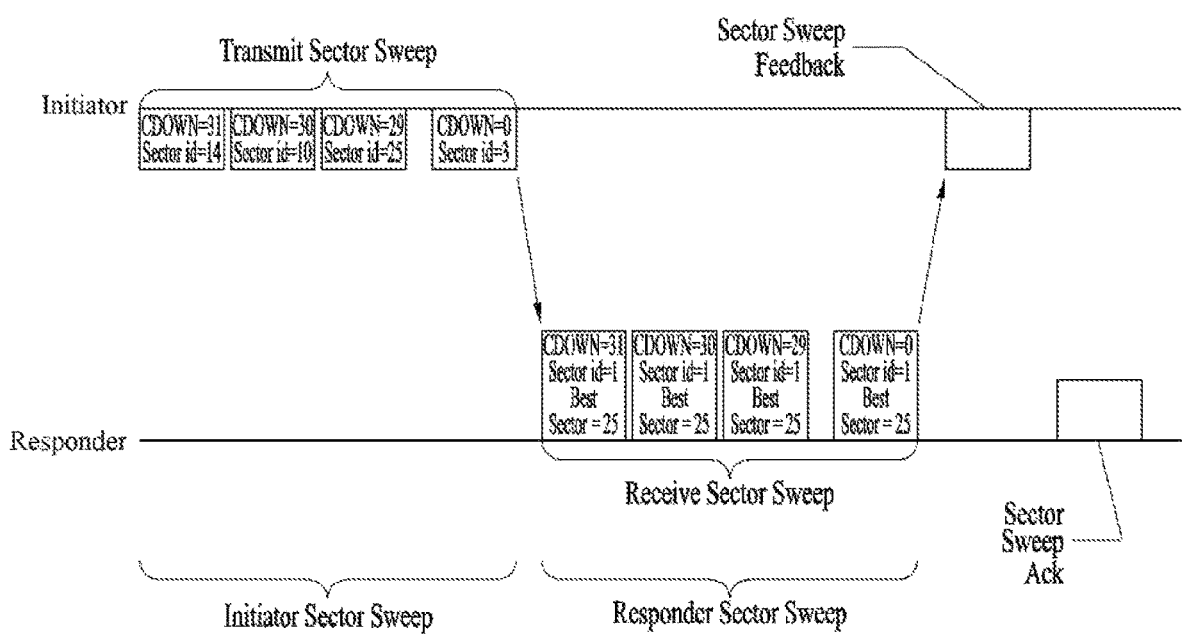
FIG. 12 and FIG. 13 are diagrams showing examples of an SLS phase.
Figure 13:
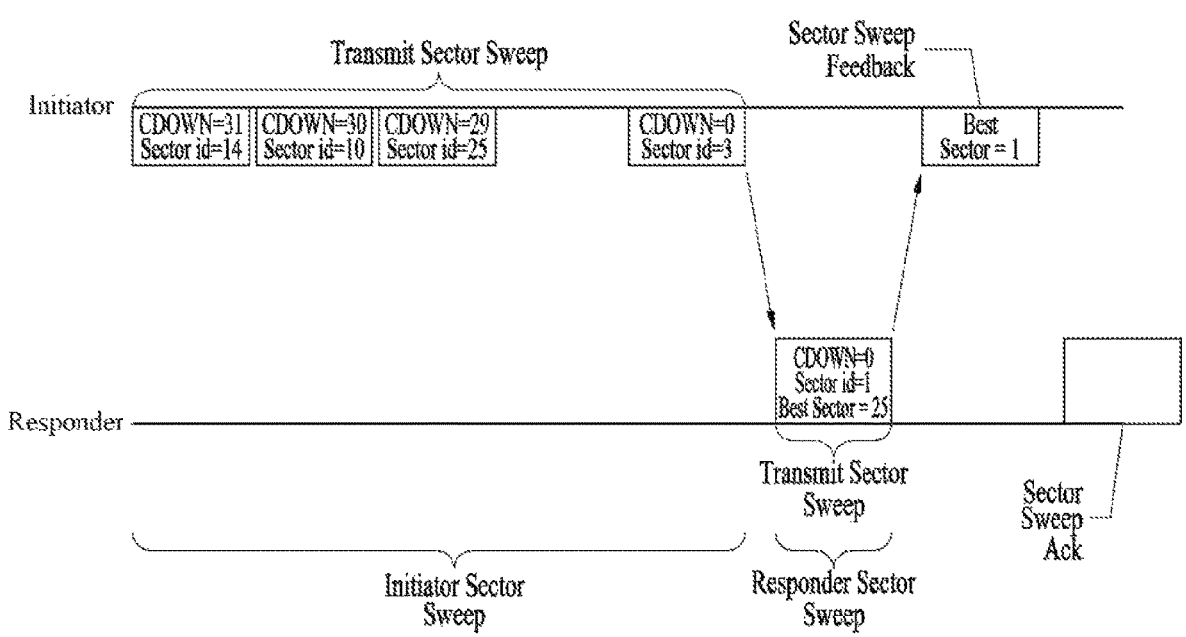

FIG. 12 and FIG. 13 are diagrams showing examples of an SLS phase.

Referring to FIG. 12, an initiator possesses many sectors and a responder has a single transmit sector and a single receive sector employed by an RSS. Hence, the responder transmits SSW frames through the same transmission sector and the initiator switches a receiving antenna, simultaneously.

Referring to FIG. 13, an initiator possesses many transmit sectors and a responder has a single transmit sector. In this case, a reception training for the initiator may be performed in the BRP phase.

The above SLS may be summarized as follows.

As a protocol for performing link detection in the 802.11ay system to which the present disclosure is applicable, SLS is a beam training scheme for network nodes to select a beam direction having the best index (e.g., Signal to Ratio (SNR), Received Signal Strength Indicator (RSSI), etc.) indicating performance of a reception channel link among successfully received frames by consecutively transceiving frames including the same information in a manner of changing a direction of a beam only.

Subsequently, BRP may be summarized as follows.

BRP is a protocol for finely adjusting a beam direction capable of maximizing a data transmission rate in the beam direction determined by an SLS or another means, and may be performed if necessary. Such BRP performs a beam training using a BRP frame including a beam training information and an information for reporting a training result, which are defined for a BRP protocol. For example, BRP is a beam training scheme of transceiving BRP frames using a beam determined by a previous beam training and then substantially performing a beam training using a beam training sequence included in an end part of a successfully transceived BRP frame. The SLS uses a frame itself for a beam training but the BRP uses a beam training sequence only. Thus, the SLS may differ from the BRP.

Such a SLS phase may be performed within a Beacon Header Interval (BHI) and/or a Data Transfer Interval (DTI).

First of all, an SLS phase performed during BHI may be the same as an SLS phase defined in the 11ad system for the coexistence with the 11ad system.

Secondly, an SLS phase performed during DTI may be performed if a beamforming training is not performed between an initiator and a responder or a BemaForming (BF) link is lost. In this case, if the initiator and the responder are 11ay STA, the initiator and the responder may transmit a short SSW frame instead of an SSW frame.

Here, the short SSW frame may be defined as a frame including a short SSW packet within a data field of a DMG control PHY or a DMG control mode PPDU. In this case, a specific format of the short SSW packet may be configured different according to a usage (e.g., I-TXSS, R-TXSS, etc.) of transmitting the short SSW packet.

Additionally, a beamforming protocol for SU-MIMO or MU-MIMO may be configured with an SISO phase and an MIMO phase.

In this case, the SISO phase may be optionally applicable to select a candidate for a beamforming training in the MIMO phase. Hence, the description of an operation in the SISO phase will be skipped in the present disclosure.

In the MIMO phase, an initiator and a responder performs a training of a transmit/receive sector and a DMG antenna to determine an optimal combination of a transmit/receive sector and antenna for MIMO transmission. Particularly, in case of MU-MIMO, an initiator and each responder in an MU group perform a training of a transmit/receive sector and DMG antenna to determine an optimal combination of a transmit/receive sector and antenna for MIMO transmission.

Figure 14:
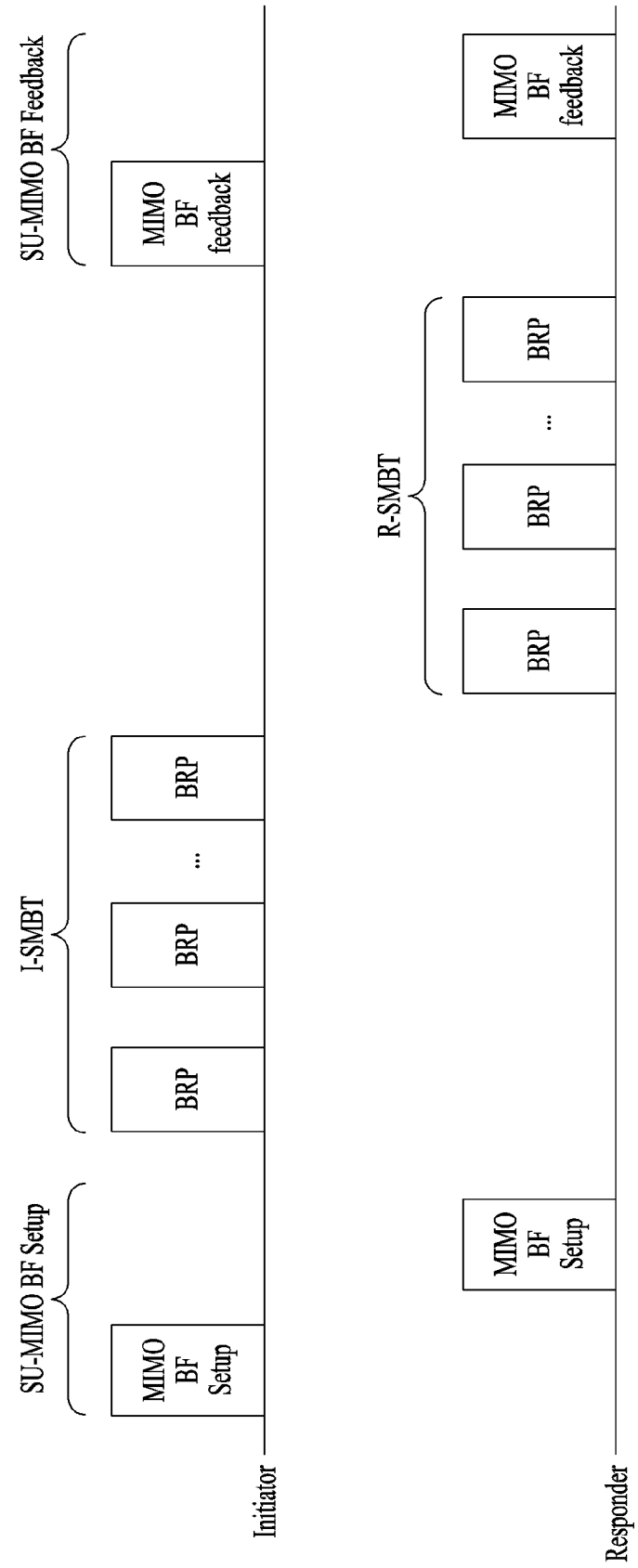
FIG. 14 is a diagram schematically showing an MIMO phase for SU-MIMO applicable to the present disclosure.

FIG. 14 is a diagram schematically showing an MIMO phase for SU-MIMO applicable to the present disclosure. Referring to FIG. 14, an MIMO phase for SU-MIMO may include 4 subphases as follows: SU-MIMO BF setup subphase; initiator SU-MIMO BF Training (SMBT) subphase; responder SMBT; and SU-MIMO BF feedback subphase.

In the SU-MIMO BF setup subphase, the initiator may send a MIMO BF Setup frame with 'SU/MU' field set to 1 and 'Link Type' field set to 1 to the responder. In channel aggregation, the initiator may send a MIMO BF Setup frame with 'Aggregation Requested' field set to 1 to the responder. 'Transmitter Address (TA)' field and 'Receiver Address (RA)' field of the MIMO BF Setup frame may be set to Medium Access Control (MAC) addresses of the initiator and the responder, respectively. (In the SU-MIMO BF setup subphase, the initiator shall send a MIMO BF Setup frame with the SU/MU field set to 1 and the Link Type field set to 1 to the responder. In channel aggregation, the initiator shall send a MIMO BF Setup frame with the Aggregation Requested field set to 1 to the responder. The TA field and the RA field of the MIMO BF Setup frame shall be set to the MAC addresses of the initiator and the responder, respectively.)

The responder may send a MIMO BF Setup frame with 'SU/MU' field set to 1 and 'Link Type' field set to 0 after SIFS from a timing of the reception of the MIMO BF Setup frame from the initiator. In channel aggregation, the responder may send a MIMO BF Setup frame with 'Aggregation Requested' field set to 1 to the initiator. (The responder shall send a MIMO BF Setup frame with the SU/MU field set to 1 and the Link Type field set to 0 a SIFS following the reception of the MIMO BF Setup frame from the initiator. In channel aggregation, the responder shall send a MIMO BF Setup frame with the Aggregation Requested field set to 1 to the initiator.)

The initiator may initiate the initiator SMBT subphase after MBIFS from a timing of the reception of the MIMO BF Setup frame from the responder. In the initiator SMBT subphase, the initiator may transmit EDMG BRP-RX/TX packets (including TRN field) to the responder. Particularly, in channel aggregation, the EDMG BRP-RX/TX packets may be transmitted using a non-EDMG duplicate format. In this case, each of the EDMG BRP-RX/TX packets may be separated in SIFS interval. (The initiator shall initiate the initiator SMBT subphase a MBIFS following reception of the MIMO BF Setup frame from the responder. In the initiator SMBT subphase, the initiator shall transmit EDMG BRP-RX/TX packets to the responder. In channel aggregation, the EDMG BRP-RX/TX packets shall be transmitted using the non-EDMG duplicate format. Each EDMG BRP-RX/TX packet shall be separated by SIFS.)

In this case, each of the transmitted EDMG BRP-RX/TX packets is used to train one or more transmit sectors and a predetermined number of receive AWVs (for each transmit sector). In each of the EDMG BRP-RX/TX packets, (for each selected transmit sector) the initiator may include TRN field (for the responder to perform a receive AWV training) in PPDU. (Each transmitted EDMG BRP-RX/TX packet is used to train one or more transmit sectors and, for each transmit sector, a number of receive AWVs. In each EDMG BRP-RX/TX packet, the initiator shall include, for each selected transmit sector, TRN subfields in the TRN field of the PPDU for the responder to perform receive AWV training.)

Subsequently, the responder may initiate the responder SMBT subphase after MBIFS from a timing of the reception of the EDMG BRP-RX/TX packet with the BRP CDOWN field set to 0 from the initiator. In the responder SMBT subphase, the responder may transmit an EDMG BRP-RX/TX packet (including TRN field) to the initiator. Particularly, in channel aggregation, the EDMG BRP-RX/TX packets may be transmitted using the non-EDMG duplicate format. In doing so, the EDMG BRP-RX/TX packets may be separated from each other in SIFS interval. (The responder shall initiate the responder SMBT subphase a MBIFS following the reception of an EDMG BRP-RX/TX packet with the BRP CDOWN field set to 0 from the initiator. In the responder SMBT subphase, the responder shall transmit EDMG BRP-RX/TX packets to the initiator. In channel aggregation, the EDMG BRP-RX/TX packets shall be transmitted using the non-EDMG duplicate format. Each EDMG BRP-RX/TX packet shall be separated by SIFS.)

Subsequently, the initiator may initiate the SU-MIMO BF feedback subphase after MBIFS from a timing of the reception of the EDMG BRP-RX/TX packet with the BRP CDOWN field set to 0 from the responder. All frames transmitted in the SU-MIMO BF feedback subphase may be sent using the DMG control mode. In the SU-MIMO BF feedback subphase, the initiator may send the responder a MIMO BF Feedback frame with 'SU/MU' field set to 1 and 'Link Type' field set to 0. Particularly, in channel aggregation, the initiator may send a MIMO BF Feedback frame with 'Aggregation Present' field set to 1 to the responder. The TA field of the MIMO BF Feedback frame may be set to the MAC address of the initiator and the RA field may be set to the MAC address of the responder. (The initiator shall initiate the SU-MIMO BF feedback subphase a MBIFS following reception of an EDMG BRP-RX/TX packet with the BRP CDOWN field set to 0 from the responder. All frames transmitted during the SU-MIMO BF feedback subphase should be sent using the DMG control mode. In the SU-MIMO BF feedback subphase, the initiator shall send to the responder a MIMO BF Feedback frame with the SU/MU field set to 1 and the Link Type field set to 0. In channel aggregation, the initiator shall send a MIMO BF Feedback frame with the Aggregation Present field set to 1 to the responder. The TA field of the MIMO BF Feedback frame shall be set to the MAC address of the initiator and the RA field shall be set to the MAC address of the responder.)

The responder may send a MIMO BF Feedback frame to the initiator with 'SU/MU' field set to 1 and 'Link Type' field set to 1 after SIFS from a timing of the reception of a MIMO BF Feedback frame from the initiator. Particularly, in channel aggregation, the responder may send a MIMO BF Feedback frame with 'Aggregation Present' field set to 1 to the initiator. The TA field of the MIMO BF Feedback may be set to the MAC address of the responder and the RA field may be set to the MAC address of the initiator. (The responder shall send a MIMO BF Feedback frame to the initiator with the SU/MU field set to 1 and the Link Type field set to 1 a SIFS following reception of a MIMO BF Feedback frame from the initiator. In channel aggregation, the responder shall send a MIMO BF Feedback frame with the Aggregation Present field set to 1 to the initiator. The TA field of the MIMO BF Feedback shall be set to the MAC address of the responder and the RA field shall be set to the MAC address of the initiator.)

In addition, the MIMO phase for MU-MIMO may be configured with a downlink MIMOI phase and an uplink MIMO phase.

Figure 15:
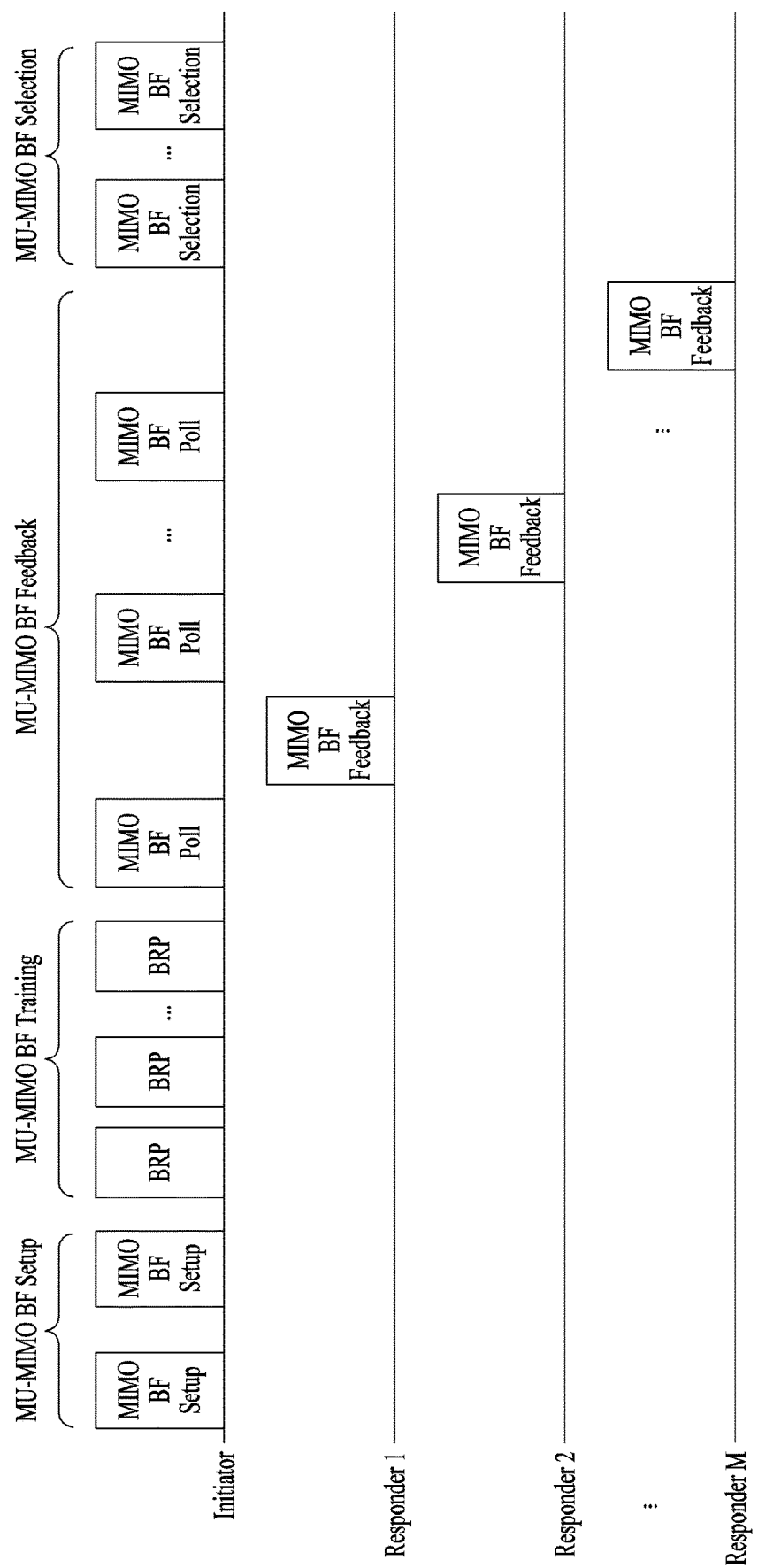
FIG. 15 is a diagram schematically showing a downlink MIMO phase applicable to the present disclosure.

FIG. 15 is a diagram schematically showing a downlink MIMO phase applicable to the present disclosure.

Referring to FIG. 15, the downlink MIMO phase may be configured with 4 subphases as follows; MU-MIMO BF setup subphase; MU-MIMO BF training subphase; MU-MIMO BF feedback subphase; and MU-MIMO BF selection subphase.

Here, the MU-MIMO BF training subphase and the MU-MIMO BF feedback subphase may not exist in the MIMO phase depending on conditions.

In the MU-MIMO BF setup subphase, the initiator may transmit one or more MIMO BF Setup frames with 'SU/MU' field set to 0 and 'DL/UL MIMO Phase' field set to 1 to each responder in the MU group. Particularly, in channel aggregation, the initiator may send one or more MIMO BF Setup frames with 'Aggregation Requested' field set to 1 to each responder in the MU group. The initiator may transmit the minimum number of MIMO BF Setup frames to reach all responders in the MU group. (In the MU-MIMO BF setup subphase, the initiator shall transmit one or more MIMO BF Setup frame with the SU/MU field set to 0 and the DL/UL MIMO Phase field set to 1 to each responder in the MU group. In channel aggregation, the initiator shall send one or more MIMO BF Setup frame with the Aggregation Requested field set to 1 to each responder in the MU group. The initiator should transmit the minimum number of MIMO BF Setup frames to reach all responders in the MU group.)

The MIMO BF Setup frames should be sent using the DMG control mode or using a non-EDMG duplicate PPDU transmitted with the DMG Control modulation class. (The MIMO BF Setup frames should be sent using the DMG control mode or using a non-EDMG duplicate PPDU transmitted with the DMG Control modulation class.)

A Transmitter Address (TA) field of the MIMO BF Setup frame is set to BSSID of the initiator, and an RA field of the MIMO BF Setup frame is set to a broadcast address.

The MIMO BF Setup frame may indicate the EDMG group ID of the MU group in the EDMG Group ID field, each remaining responder in the Group User Mask field, and a unique dialog token in the Dialog Token field for identifying MU-MIMO BF training. (The MIMO BF Setup frame shall indicate the EDMG group ID of the MU group in the EDMG Group ID field, each remaining responder in the Group User Mask field, and a unique dialog token in the Dialog Token field for identifying MU-MIMO BF training).

To reduce the MU-MIMO BF training time, the initiator may select a subset of TX sectors for each DMG antenna and the number of TRN subfields required for AWV training reception based on the L-TX-RX subfields and the EDMG TRN-Unit M subfields in the feedback received in the SISO phase from responders. (To reduce the MU-MIMO BF training time, the initiator may select a subset of TX sectors for each DMG antenna and the number of TRN subfields required for receive AWV training based on the L-TX-RX subfields and the EDMG TRN-Unit M subfields in the feedback from responders received at the SISO phase).

A responder whose corresponding bit in the Group User Mask field of the received MIMO BF Setup frame is set to 0 may ignore frames transmitted in the following MU-MIMO BF training subphase and MU-MIMO BF feedback subphase. (A responder whose corresponding bit in the Group User Mask field of the received MIMO BF Setup frame is set to 0 can ignore frames transmitted in the following MU-MIMO BF training subphase and MU-MIMO BF feedback subphase).

The initiator may initiate the MU-MIMO BF training subphase after MBIFS from a timing of the transmission of the MIMO BF Setup frame. In the MU-MIMO BF training subphase, the initiator may transmit one or more EDMG BRP-RX/TX packets to the remaining responders in the MU group. Particularly, in channel aggregation, each of the EDMG BRP-RX/TX packets may be transmitted using the non-EDMG duplicate format. Each of the EDMG BRP-RX/TX packets may be separated by SIFS. (The initiator shall initiate the MU-MIMO BF training subphase a MBIFS following the transmission of the MIMO BF Setup frame. In the MU-MIMO BF training subphase, the initiator shall transmit one or more EDMG BRP-RX/TX packets to the remaining responders in the MU group. In channel aggregation, each EDMG BRP-RX/TX packets shall be transmitted using the non-EDMG duplicate format. Each EDMG BRP-RX/TX packet shall be separated by SIFS.)

Particularly, in the MU-MIMO BF training subphase, the initiator may transmit BRP frames using the EDMG PHY layer. (In the MU-MIMO BF training subphase, the initiator shall transmit BRP frames using the EDMG PHY). Each of the transmitted BRP frames is used to train one or more transmit sectors and, for each transmit sector, a predetermined number of receive AWVs. (Each transmitted BRP frame is used to train one or more transmit sectors and, for each transmit sector, a number of receive AWVs). The initiator in each of the BRP frames may include, for each selected sector, TRN-Units in the TRN field for intended responders to perform a receive sector training. (In each BRP frame the initiator shall include, for each selected sector, TRN-Units in the TRN field for intended responders to perform receive sector training).

The number of TRN-Units included in the TRN field should be the maximum number of receive sectors across all the remaining intended responders based on the feedback from the SISO phase. (The number of TRN-Unit included in the TRN field should be the maximum number of receive sectors across all the remaining intended responders based on the feedback from the SISO phase)

The initiator may transmit a BRP frame with orthogonal waveforms to train multiple (up to 4) transmit DMB antennas simultaneously through the same BRP frame and hence reduce the training time. (An initiator may transmit a BRP frame with orthogonal waveforms to train multiple (up to 4) transmit DMG antennas simultaneously through the same BRP frame and hence reduce the training time).

The MU-MIMO BF training subphase is performed by setting, for a BRP frame, the TXVECTOR parameter EDMG_TRN_LEN to a value greater than 0 and the parameter RX_TRN_PER_TX_TRN to a value greater than 1. (The MU-MIMO BF training subphase is performed by setting, for a BRP frame, the TXVECTOR parameter EDMG_TRN_LEN to a value greater than zero and the parameter RX_TRN_PER_TX_TRN to a value greater than one).

The initiator may initiate the MU-MIMO BF feedback subphase after MBIFS from a timing of the transmission of the EDMG BRP RX-TX packet with 'BRP CDOWN' field set to 0. In the MU-MIMO BF feedback subphase, the initiator may transmit a MIMO BF Poll frame with 'Poll Type' field set to 0 to poll each remaining responder to collect MU-MIMO BF feedback from the preceding MU-MIMO BF training subphase. The MIMO BF Poll frame may be sent using the DMG control mode. (The initiator may initiate the MU-MIMO BF feedback subphase after MBIFS from a timing of the transmission of the EDMG BRP RX-TX packet with the BRP CDOWN field set to 0. In the MU-MIMO BF feedback subphase, the initiator may transmit a MIMO BF Poll frame with the Poll Type field set to 0 to poll each remaining responder to collect MU-MIMO BF feedback from the preceding MU-MIMO BF training subphase. The MIMO BF Poll frames may be sent using the DMG control mode.)

In case of receiving a MIMO BF Poll frame for which a remaining responder is an addressed recipient, the responder may transmit a MIMO BF Feedback frame with 'SU/MU' field set to 1 to the initiator. Particularly, in channel aggregation, the responder may send a MIMO BF Feedback frame with 'Aggregation Present' field set to 1 to the initiator. The RA field of the MIMO BF Feedback frame may be set to Basic Service Set Identity (BSSID) of the initiator and the TA field may be set to a MAC address of the responder. (Upon receiving a MIMO BF Poll frame for which a remaining responder is the addressed recipient, the responder may transmit a MIMO BF Feedback frame with the SU/MU field set to 1 to the initiator. In channel aggregation, the responder may send a MIMO BF Feedback frame with the Aggregation Present field set to 1 to the initiator. The RA field of the MIMO BF Feedback frame may be set to the BSSID of the initiator and the TA field may be set to the MAC address of the responder.)

Each MIMO BF Feedback Poll frame and MIMO BF Feedback frame sent back by the responder may be separated by SIFS. (Each MIMO BF Feedback Poll frame and MIMO BF Feedback frame sent back by the responder may be separated by SIFS.) Each MIMO BF Feedback Poll frame carries a dialog token that identifies a MU-MIMO BF training. (Each MIMO BF Feedback Poll frame carries the dialog token that identifies the MU-MIMO BF training.) The MIMO BF Feedback frame carries the list of the received initiator's transmit DMG antennas/sectors together with the corresponding responder's receive DMG antenna/sector and the associated quality indicated. (The MIMO BF Feedback frame carries the list of received initiator's transmit DMG antennas/sectors, each with its corresponding responder's receive DMG antenna/sector and the associated quality indicated.)

The initiator may initiate the MU-MIMO BF selection subphase after MBIFS from a timing of the reception of the MIMO BF Feedback frame from the last remaining responder. In the MU-MIMO BF selection subphase, the initiator may transmit one or more MIMO BF Selection frames with 'MU-MIMO Transmission Configuration Type' set to 1 to each responder in the MU group. The initiator may transmit the minimum number of MIMO BF Selection frames to reach all responders in the MU group. The MIMO BF Selection frame may be sent using the DMG control mode. (The initiator may initiate the MU-MIMO BF selection subphase after MBIFS from a timing of the reception of the MIMO BF Feedback frame from the last remaining responder. In the MU-MIMO BF selection subphase, the initiator may transmit one or more MIMO BF Selection frames with the MU-MIMO Transmission Configuration Type set to 1 to each responder in the MU group. The initiator should transmit the minimum number of MIMO BF Selection frames to reach all responders in the MU group. The MIMO BF Selection frames should be sent using the DMG control mode.)

In the MU-MIMO BF selection subphase, the initiator may transmit a MIMO BF Selection frame to each responder in the MU group containing a dialog token identifying the MU-MIMO BF training, one or multiple sets of the MU transmission configurations, and the intended receiving STAs for each MU transmission configuration. (In the MU-MIMO BF selection subphase, the initiator may transmit a MIMO BF Selection frame to each responder in the MU group containing the dialog token identifying the MU-MIMO BF training, one or multiple sets of the MU transmission configurations, and the intended recipient STAs for each MU transmission configuration).

The final set of the selected responders in the MU group contained in the MIMO BF Selection frame does not have to be the same as the initial set of the intended responders. (The final set of selected responders in the MU group contained in the MIMO BF Selection frame does not have to be the same as the initial set of intended responders.) The initiator transmits the minimum number of the MIMO BF Selection frames to the selected responders. (The initiator should transmit the minimum number of MIMO BF Selection frames to selected responders.)

Figure 16:
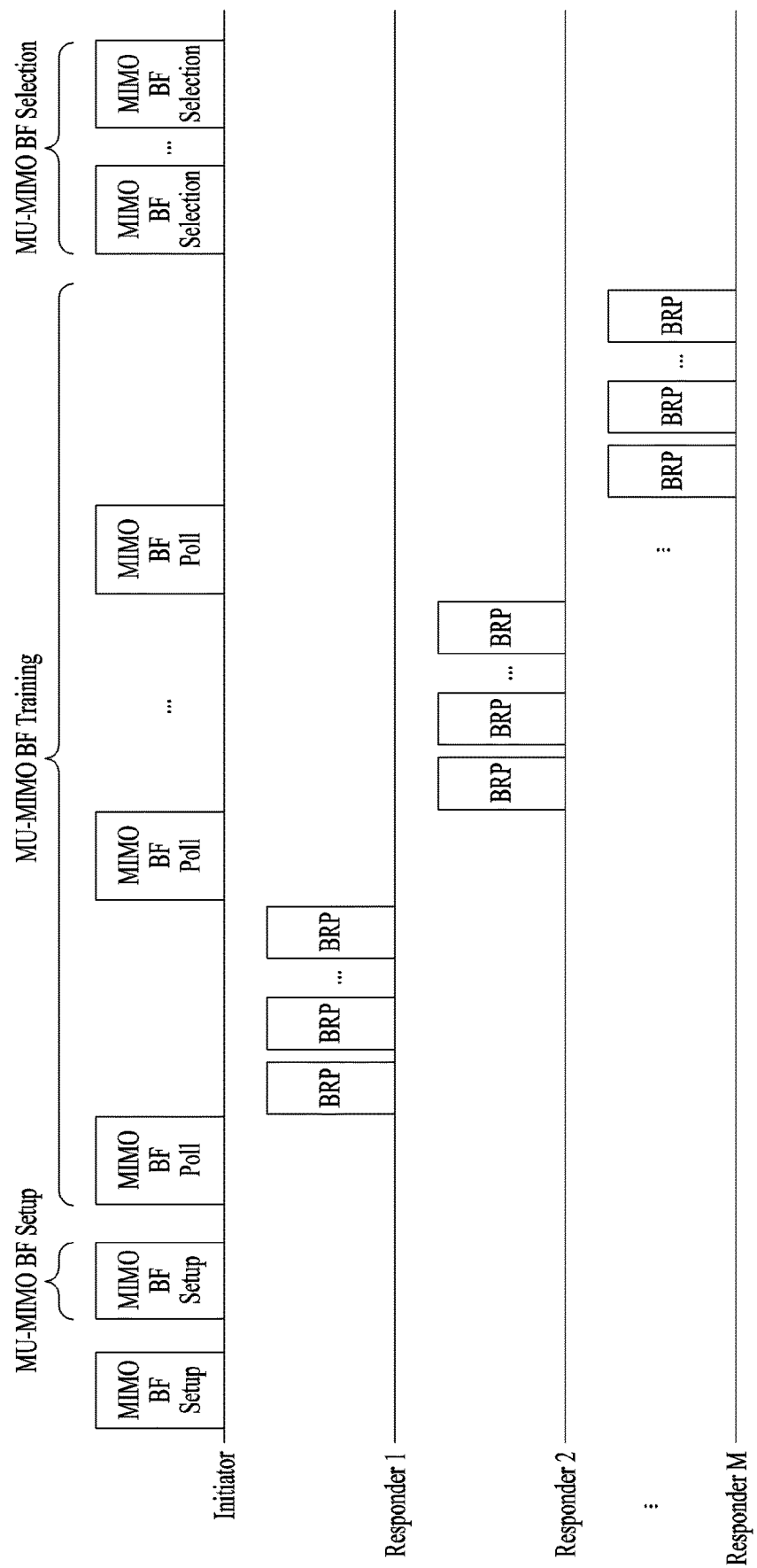
FIG. 16 is a diagram schematically showing an uplink MIMO phase applicable to the present disclosure.

FIG. 16 is a diagram schematically showing an uplink MIMO phase applicable to the present disclosure.

An uplink MIMO phase may reduce the length of a MU-MIMO BF training section.

If the following condition is met, an initiator may initiate an uplink MIMO phase procedure.

Case that 'UL MU-MIMO Supported' field in EDMG Capabilities element of each of an initiator and an intended receiver is 1 and that 'Antenna Patten Reciprocity' field in DMG Capabilities element of the initiator is 1.

As shown in FIG. 16, the uplink MIMO phase may include 3 subphases as follows: MU-MIMO BF setup subphase; MU-MIMO BF training subphase; and MU-MIMO selection subphase. Each Subphase is separated by MBIFPS.

Here, the MU-MIMO BF training subphase may not exist in the MIMO phase depending on conditions.

In the MU-MIMO BF setup subphase, the initiator may transmit one or more MIMO BF Setup frames with 'SU/MU' field set to 0 and 'DL/UL MU-MIMO Phase' field set to 0 to each responder in the MU group. Particularly, in channel aggregation, the initiator may send one or more MIMO BF Setup frames with 'Aggregation Requested' field set to 1 to each responder in the MU group. The initiator may transmit the minimum number of MIMO BF Setup frames to reach all responders in the MU group. (In the MU-MIMO BF setup subphase, the initiator may transmit one or more MIMO BF Setup frames with the SU/MU field set to 0 and the DL/UL MU-MIMO Phase field set to 0 to each responder in the MU group. In channel aggregation, the initiator may send one or more MIMO BF Setup frames with the Aggregation Requested field set to 1 to each responder in the MU group. The initiator should transmit the minimum number of MIMO BF Setup frames to reach all responders in the MU group.)

The MIMO BF Setup frames may be sent using a DMG control mode or using a non-EDMG duplicate PPDU transmitted together with a DMG control modulation class. (The MIMO BF Setup frames should be sent using the DMG control mode or using a non-EDMG duplicate PPDU transmitted with the DMG control modulation class.)

The initiator may initiate an MU-MIMO BF training subphase after MBIFS from a timing of the transmission of the MIMO BF Setup frame. In the MU-MIMO BF training subphase, the initiator may transmit a MIMO BF Poll frame with 'Poll Type' field set to 1 to each remaining responder in the MU group. Each MIMO BF frame may be sent using a DMG control mode or using a non-EDMG duplicate PPDU transmitted together with the DMG control modulation class. (The initiator may initiate an MU-MIMO BF training subphase after MBIFS from a timing of the transmission of the MIMO BF Setup frame. In the MU-MIMO BF training subphase, the initiator may transmit a MIMO BF Poll frame with the Poll Type field set to 1 to each remaining responder in the MU group. Each MIMO BF Poll frame should be sent using the DMG control mode or using a non-EDMG duplicate PPDU transmitted with the DMG control modulation class.)

In case of receiving a MIMO BF Poll frame for which a remaining responder is an addressed recipient, the responder may transmit one or more EDMG BRP-RX/TX packets to the initiator, where a TXVECTOR parameter EDMG_TRN_LEN is set to a value greater than 0 and parameters RX_TRN_PER_TX_TRN, EDMG_TRN_M and EDMG_TRN_P are set to the values of L-TX-RX field, and Requested EDMG TRN-Unit M field and Requested EDMG TRN-Unit P field are received in the corresponding MIMO BF Poll frame, respectively. particularly, in channel aggregation, each EDMG BRP-RX/TX packets may be transmitted using the non-EDMG duplicate format. (Upon receiving a MIMO BF Poll frame for which a remaining responder is the addressed recipient, the responder may transmit one or more EDMG BRP-RX/TX packets to the initiator, where the TXVECTOR parameter EDMG_TRN_LEN is set to a value larger than zero, and the parameters RX_TRN_PER_TX_TRN, EDMG_TRN_M and EDMG_TRN_P are set to the values of the L-TX-RX field, the Requested EDMG TRN-Unit M field and the Requested EDMG TRN-Unit P field in the corresponding MIMO BF Poll frame received from the initiator, respectively. In channel aggregation, each EDMG BRP-RX/TX packets may be transmitted using the non-EDMG duplicate format.)

Additionally, the responder may transmit each EDMG BRP-RX/TX packet to train multiple TX DMG antennas simultaneously using TRN subfield, thereby reducing the training time. 'TX Antenna Mask' field of each EDMG BRP-RX/TX packet may indicate TX DMG antenna used by the responder to transmit the EDMG BRP-RX/TX packet. 'BRP CDOWN' field of each EDMG BRP-RX/TX packet may indicate the number of remaining EDMG BRP RX/TX packets to be transmitted by the responder. (Additionally, the responder may transmit each EDMG BRP-RX/TX packet to train multiple TX DMG antennas simultaneously using TRN subfields to reduce the training time. The TX Antenna Mask field of each EDMG BRP-RX/TX packet may indicate the TX DMG antenna(s) which is being used by the responder to transmit the EDMG BRP-RX/TX packet. The BRP CDOWN field of each EDMG BRP-RX/TX packet may indicate the number of remaining EDMG BRP RX/TX packets to be transmitted by the responder.)

The MIMO phase applicable to the beamforming procedure for SU/MU MIMO is summarized as follows.

As shown in FIGS. 14 to 16, an initiator sends a MIMO BF setup frame for the configuration of SU/MU MIMO BF to a responder. As described above, the initiator may make a request for a BF setup for SU-MIMO or a BF setup for MU-MIMO to the responder using 'SU/MU' field value of the MIMO BF setup frame. Particularly, the initiator may make a request for channel measurement feedback for a link specified by 'Link Type' to the responder through 'MIMO FBCK-REQ' field of the MIMO BF setup frame. In doing so, the MIMO BF setup frame may be sent without TRN field.

3. Embodiment Applicable for the Present Disclosure

A specific method for a PCP/AP to simultaneously support beamforming of several STAs during a MU-MIMO BF training subphase in the above-described downlink MIMO beamforming process and a method for the STAs to perform beamforming correspondingly are described in detail as follows.

First of all, STAs participating in a MIMO beamforming process correspond to STAs included in EDMG Group Set Element in an association phase. In this case, the EDMG Group Set Element may include a plurality of groups and each of the groups may include Association Identifier (AID) on a plurality of STAs.

The STAs participating in the MIMO beamforming process may be determined by EDMG Group ID Set element transmitted in a DMG beacon or a broadcast (Announce) frame. Hence, the EDMG Group ID Set element allows an AP/PCP to define a group of MU capable EDMG STAs to perform a DL MU-MIMO transmission. (The EDMG Group ID Set element allows an AP or PCP to define groups of MU capable EDMG STAs to perform DL MU-MIMO transmissions).

EDMG Group ID Set element according to the present disclosure may be configured as the following format.

| Element ID | Length | Element ID Extension | Number of EDMG Groups | EDMG Group 1 | ... | EDMG Group N |
|---|---|---|---|---|---|---|
| Octets: 1 | 1 | 1 | 1 | 9 | ... | 9 |

In this case, each EDMG Group field may be configured as the following format.

| | EDMG Group ID | AID 0 | AID 1 | ... | AID 7 |
|---|---|---|---|---|---|
| Octets: | 1 | 1 | 1 | ... | 1 |

Alternatively, each EDMG Group field may be configured as the following format.

| B0 B7 EDMG Group ID | B8 B12 Group Size (N) | B13 B15 Reserved | B16 B23 $AID_0$ | B24 B31 $AID_1$ | ... | B(8 × (N + 1)) B(8 × (N + 2) − 1) $AID_{N-1}$ |
|---|---|---|---|---|---|---|
| Bits: 8 | 5 | 3 | 8 | 8 | ... | 8 |

And, as described above, an initiator may simultaneously support a multitude of responders participating in MU-MIMO BF during a MU-MIMO BF training subphase. To this end, BRF frame is usable and a beamforming training may be performed through TRP field.

Yet, the related art fails in disclosing a specific method for an initiator to perform (or support) a beamforming for specific STAs only instead of all user equipments. Here, the specific STAs may mean STAs included in specific EDMG Group ID.

Therefore, unlike the related art, a specific signal transceiving method for an initiator to perform (or support) beamforming simultaneously for specific STAs only and a beamforming performing/supporting method based on the same are described in detail in the present disclosure.

3.1. First Method

In a MIMO BF training subphase, an initiator may transmit a BRP frame including information on AID and/or EDMG Group ID of STAs belonging to the EDMG Group ID.

Here, the BRP frame may include an EDMG BRP Request element format as follows.

According to the present disclosure, the following field may be added by increasing a bit size configuring the EDMG BRP Request element format.

| | EDMG Group ID | AID 0 | AID 1 | ... | AID 7 |
|---|---|---|---|---|---|
| Octets: | 1 | 1 | 1 | ... | 1 |

Therefore, each of the STAs having received the BRP frame decodes the EDMG Group ID and AID in the BRP frame, thereby determining whether the AID information of its own is included. If the AID information is included, the corresponding STA may perform a beamforming training during the corresponding MIMO BF training subphase.

On the contrary, a new EDMG BRP dedicated frame may be newly defined. In this case, the new EDMG BRP dedicated frame includes the aforementioned EDMG Group ID and AID N fields, thereby informing a responder of identification information on STAs participating in a MIMO BF training through the EDMG Group ID and AID.

3.2. Second Method

An initiator may indicate AID of STAs participating in a MIMO BF training through EDMG Header-A field in PPDU for MU.

FIG. 17 is a diagram showing fields included in an EDMG Header-A field within PPDU for MU applicable to the present disclosure.

Referring to FIG. 17, an EDMG Header-A field within PPDU for MU includes SS Descriptor Set indicating Spatial Stream (SS) assignment for maximum 8 STAs. Hence, an initiator may indicate AID of STAs participating in a MIMO BF training in a corresponding interval through the SS Descriptor Set of EDMG Header-A.

Here, each SS Descriptor Set field may be configured as follows.

| | AID | Number of SS |
|---|---|---|
| Bits | 8 | 1 |

In this case, a value of 'Number of SS' field in each SS Descriptor Set field may be set to 0.

Moreover, although PPDU including the EDMG Header-A field is PPDU for MU, the initiator transmits the

| B0 B7 Element ID | B8 B15 Length | B16 B23 Element ID Extension | B24 B31 L-TX-L-RX | B32 B39 L-TX-RX | B40 B50 TX Sector ID | B51 B52 EDMG TRN-Unit P | B53 B56 EDMG TRN-Unit M | B57 B58 EDMG TRN-Unit N |
|---|---|---|---|---|---|---|---|---|
| Bits: 8 | 8 | 8 | 8 | 8 | 11 | 2 | 4 | 2 |

| B59 TXSS-REQ | B60 TXSS-REQ-RECIPROCAL | B61 B69 TXSS-SECTORS | B70 B75 BRP CDOWN | B76 B83 TX Antenna Mask | B84 B87 Reserved |
|---|---|---|---|---|---|
| Bits: 1 | 1 | 9 | 6 | 8 | 4 |

PPDU for MU using a single stream and may set a Modulation and Coding Scheme (MCS) and a length value, which are indicated in EDMG Header-B in the PPDU, to be identical all.

Through such a method, the initiator may deliver a BRP frame of the same information for specific STAs to the specific STAs only.

Therefore, when the received PPDU for MU is transmitted using the single stream and the EDMG Header-B field in the PPDU indicate the same MCS and length value all, a responder having received the corresponding BRP frame detects whether the SS Descriptor Set field included in the EDMG Header-A field in the PPDU indicates AID of its own, thereby determining whether to participate in the MIMO BF training in the corresponding interval.

3.3. Third Method

An initiator may transmit TA and RA values of a BRP frame (or a PPDU including the BRP Frame) during a MIMO BF training subphase in a manner of setting the TA and RA values to a Medium Access Control (MAC) address of the initiator.

Particularly, as described above, a MU-MIMO BF setup phase exists prior to the execution of the MU-MIMO BF training.

Hence, in the MU-MIMO BF setup phase, the initiator may indicate AID and Group ID of specific STAs participating in the MU-MIMO BF training and secure Transmission Opportunity (TXOP) for a full beamforming section.

In this case, in the MU-MIMO BF training subphase, the initiator may send a BRP PPDU with the TA and RA values set to the MAC address value of the initiator.

In response to this, the STAs determined (to participate in the MU-MIMO BF training) in the MU-MIMO BF setup subphase may perform a beamforming training if receiving the BRP PPDU with the TA and RA values set to the MAC address value of the initiator during the MU-MIMO BF training subphase.

Particularly, the STAs determined (to participate in the MU-MIMO BF training) in the MU-MIMO BF setup subphase may assume that the BRP PPDU is a BRP PPDU for the MU-MIMO BF training if receiving the BRP PPDU with the TA and RA values set to the MAC address value of the initiator during the MU-MIMO BF training subphase. Hence, the STAs may perform the MU-MIMO BF training using the BRP PPDU.

3.4. Fourth Method

An initiator may signal that a BRP frame transmitted during a MIMO BF training subphase is a BRP frame for MU BF. Responders may determine whether the BRP frame transmitted through the signaling is a BRP frame for a MIMO BF training and then perform the MIMO BF training using the BRP frame.

As described above, a MU-MIMO BF setup subphase exists prior to the execution of the MU-MIMO BF training.

Hence, in the MU-MIMO BF setup phase, the initiator may indicate AID and Group ID of specific STAs participating in the MU-MIMO BF training and secure Transmission Opportunity (TXOP) for a full beamforming section.

In this case, when the initiator transmits a BRP PPDU during the MU-MIMO BF training subphase, the initiator may signal whether the corresponding BRP frame is a BRP frame for the MIMO BF training through a MU-MIMO BF field using 1-bit size among reserved bits in the BRP frame.

| | B0 B7 Element ID | B8 B15 Length | B16 B23 Element ID Extension | B24 B31 L-RX | B32 B39 L-TX-RX | B40 B50 TX Sector ID | B51 B52 EDMG TRN-Unit P | B53 B56 EDMG TRN-Unit M | B57 B58 EDMG TRN-Unit N |
|---|---|---|---|---|---|---|---|---|---|
| Bits: | 8 | 8 | 8 | 8 | 8 | 11 | 2 | 4 | 2 |
| | B59 TXSS-REQ | B60 TXSS-REQ-RECIPROCAL | B61 B69 TXSS-SECTORS | B70 B75 BRP CDOWN | B76 B83 TX Antenna Mask | | B84 B86 Reserved | | B87 MU-MIMO BF |
| Bits: | 1 | 1 | 9 | 6 | 8 | | 3 | | 1 |

For example, if a MU-MIMO BF field value in the BRP frame is set to 1, it may indicate that the corresponding BRP frame is a BRP frame for a MU-MIMO BF training. If set to 0, it may indicate that corresponding BRP frame is a general BRP fame.

In response to this, if receiving a BRP PPDU with a value of MU-MIMO BF filed set to 1 in a MU-MIMO BF training subphase section, STAs determined (to participate in the MU-MIMO BF training) through the MU-MIMO BF setup subphase may perform a beamforming training using the BRP PPDU.

Figure 18:
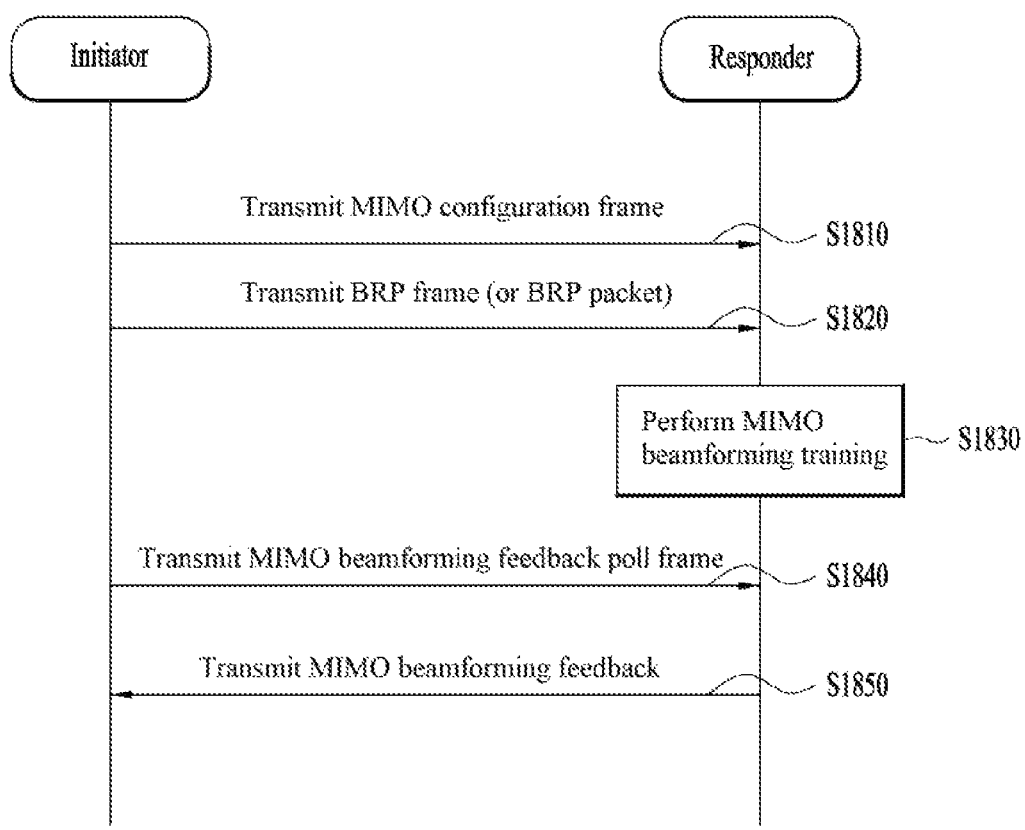
FIG. 18 is a diagram showing an operation of performing an MU-MIMO beamforming training between an initiator and a responder according to the present disclosure.

FIG. 18 is a diagram showing an operation of performing a MU-MIMO beamforming training between an initiator and a responder according to the present disclosure.

In FIG. 18, an initiator may transceive signals corresponding to a plurality of responders. Yet, for clarity of description, FIG. 18 shows a specific method that the initiator transceives signals corresponding to one of a plurality of the responders.

In a MU-MIMO BF setup subphase (i.e., MIMO beamforming setup subphase), the initiator transmits a MIMO beamforming setup frame including identification information of an STA participating in the MU-MIMO beamforming training to one or more responders [S1810].

Here, the station identification information included in the MIMO beamforming setup frame may include group Identifier (ID) information of stations participating in the MU-MIMO beamforming training and identification information of stations participating in the MU-MIMO beamforming training within a group indicated by the group ID information.

Subsequently, in the MU-MIMO beamforming training subphase, the initiator transmits a Beam Refinement Protocol (BRP) frame (or BRP packet) to one or more responders [S1820].

In doing so, Transmitter Address (TA) field and Receiver Address (RA) field included in the BRP frame (or BRP packet) may be transmitted in a manner that the MIMO beamforming setup frame is set to a Medium Access Control (MAC) address of the initiator having transmitted the MIMO beamforming setup frame.

Through the above BRP frame (or BRP packet), the initiator may lead only the responders indicated through the MIMO setup frame to perform the MIMO beamforming training using the BRP frame (or BRP packet). Moreover, having received the above BRP frame (or BRP packet), the STA may determine whether the formerly transmitted MIMO setup frame includes the identification information of the STA, thereby determining whether to perform the MIMO beamforming training using the BRP Frame (or BRP packet).

Particularly, if the station identification information included in the MIMO beamforming setup frame corresponds to the STA and the Transmitter Address (TA) field and Receiver Address (RA) field of the BRP Frame are identical to the Medium Access Control (MAC) address of the initiator having sent the MIMO beamforming setup fame, the responder performs the MU-MIMO beamforming training using the BRP frame [S1830].

To this end, the BRP frame may include a TRN Field.

In addition, in the MU-MIMO beamforming feedback subphase, the initiator may transmit a MIMO beamforming feedback poll frame, which requests MU-MIMO beamforming feedback, to one or more responders [S1840]. Subsequently, in response to the MIMO beamforming feedback poll frame, the initiator may receive MU-MIMO beamforming feedback for the previously performed MU-MIMO beamforming training from the one or more responders [S1850].

4. Device Configuration

Figure 19:
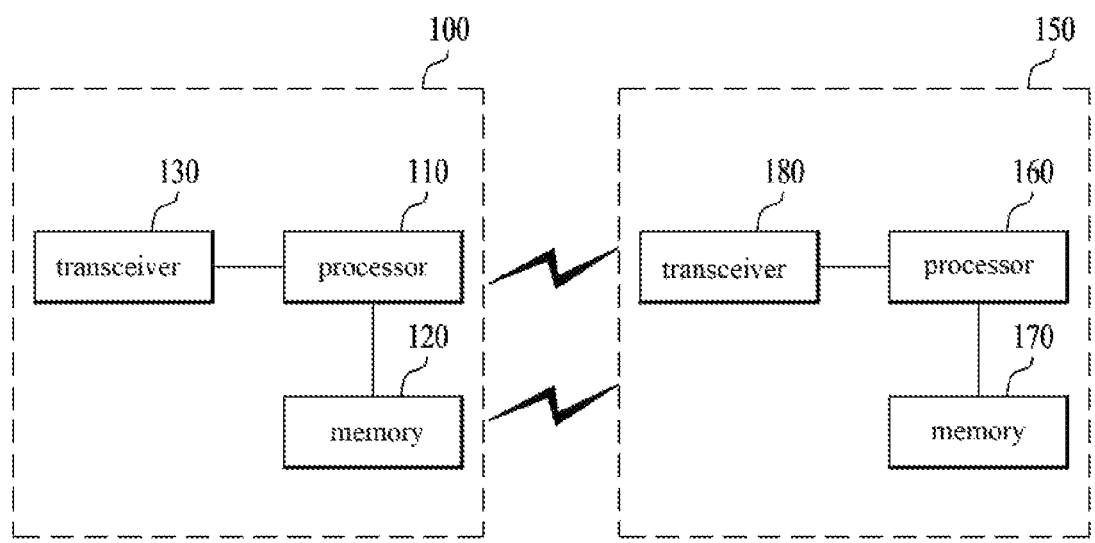
FIG. 19 is a diagram to describe a device for implementing the above-described method.

FIG. 19 is a diagram describing a device for implementing the above-described method The wireless device 100 of FIG. 19 may correspond to an initiator described in the above description, and the wireless device 150 may correspond to a responder described in the above description.

Here, the STA transmitting the signal may correspond to an 11ay UE or PCP/AP supporting the 11ay system, and the STA receiving the signal may correspond to an 11ay UE or PCP/AP supporting the 11ay system.

Hereinafter, for the convenience of description, the STA transmitting the signal is referred to as a transmitting device (100), and the STA receiving the signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present disclosure is provided so that anyone skilled in the art can implement and execute the present disclosure. In the detailed description presented herein, although the present disclosure is described with reference to the preferred exemplary embodiment of the present disclosure, it will be understood by anyone having ordinary skills in the art that diverse modifications, alterations, and variations can be made in the present disclosure. Therefore, the scope and spirit of the present disclosure will not be limited only to the exemplary embodiments of the present disclosure set forth herein. Thus, it is intended to provide the broadest scope and spirit of the appended claims of the present disclosure that are equivalent to the disclosed principles and novel characteristics of the present disclosure.

INDUSTRIAL APPLICABILITY

Although the present disclosure has been described in detail under the assumption that the present disclosure can be applied to an IEEE 802.11 based wireless LAN (WLAN) system, the present disclosure will not be limited only to this. It will be understood that the present disclosure can be applied to diverse wireless systems capable of performing data transmission based on channel bonding by using the same method as presented herein.

What is claimed is:

1. A method of performing a Multi User-Multiple Input Multiple Output (MU-MIMO) beamforming training by a Station (STA) in a Wireless LAN (WLAN) system, the method comprising:
   receiving, from an initiator by the STA, a MIMO beamforming setup frame including station identification information of a station participating in the MU-MIMO beamforming training in a MIMO beamforming setup subphase;
   receiving, from the initiator by the STA, a Beam Refinement Protocol (BRP) frame in a MU-MIMO beamforming training subphase; and
   based on (i) the station identification information being related to the STA and (ii) a Transmitter Address (TA) field and a Receiver Address (RA) field of the BRP frame being identical to a Medium Access Control (MAC) address of the initiator, performing, by the STA, the MU-MIMO beamforming training based on the BRP frame.

2. The method of claim 1, wherein the station identification information includes group Identifier (ID) information of stations participating in the MU-MIMO beamforming training and identification information of stations participating in the MU-MIMO beamforming training within a group indicated by the group ID information.

3. The method of claim 1, wherein the BRP fame includes a Training (TRN) subfield.

4. The method of claim 1, further comprising:
   receiving a MIMO beamforming feedback poll frame requesting MU-MIMO beamforming feedback in a MU-MIMO beamforming feedback subphase; and transmitting MU-MIMO beamforming feedback on the performed MU-MIMO beamforming training in response to the MIMO beamforming feedback poll frame.

5. A method of supporting a Multi User-Multiple Input Multiple Output (MU-MIMO) beamforming training by a Station (STA) in a Wireless LAN (WLAN) system, the method comprising:
transmitting, to a responder by the STA, a MIMO beamforming setup frame including station identification information of a station participating in the MU-MIMO beamforming training in a MIMO beamforming setup subphase; and
transmitting, to the responder by the STA, a Beam Refinement Protocol (BRP) frame in a MU-MIMO beamforming training subphase,
wherein, based on (i) the station identification information being related to the responder and (ii) a Transmitter Address (TA) field and a Receiver Address (RA) field of the BRP frame being identical to a Medium Access Control (MAC) address of the STA, the BRP frame informs, to the responder related to the station identification information, to perform the MU-MIMO beamforming training.

6. The method of claim 5, wherein the station identification information includes group Identifier (ID) information of stations participating in the MU-MIMO beamforming training and identification information of stations participating in the MU-MIMO beamforming training within a group indicated by the group ID information.

7. The method of claim 5, wherein the BRP fame includes a Training (TRN) subfield.

8. The method of claim 5, further comprising:
transmitting a MIMO beamforming feedback poll frame requesting MU-MIMO beamforming feedback in a MU-MIMO beamforming feedback subphase; and
receiving MU-MIMO beamforming feedback on a previously performed MU-MIMO beamforming training from one or more responders in response to the MIMO beamforming feedback poll frame.

9. A station (STA) performing a Multi User-Multiple Input Multiple Output (MU-MIMO) beamforming training in a Wireless LAN (WLAN) system, the station comprising:
a transceiver configured to have one or more Radio Frequency (RF) chains and transceive signals with one or more other stations; and
a processor configured to be connected to the transceiver and process the signals transceived with the one or more other stations,
wherein the processor is further configured to:
control the transceiver to receive, from an initiator, a MIMO beamforming setup frame including station identification information of a station participating in the MU-MIMO beamforming training in a MIMO beamforming setup subphase,
control the transceiver to receive, from the initiator, Beam Refinement Protocol (BRP) frame in a MU-MIMO beamforming training subphase, and
based on (i) the station identification information being related to the STA and (ii) a Transmitter Address (TA) field and a Receiver Address (RA) field of the BRP frame being identical to a Medium Access Control (MAC) address of the initiator, perform the MU-MIMO beamforming training based on the BRP frame.

10. A station (STA) supporting a Multi User-Multiple Input Multiple Output (MU-MIMO) beamforming training in a Wireless LAN (WLAN) system, the station comprising:
a transceiver configured to have one or more Radio Frequency (RF) chains and transceive signals with one or more other stations; and
a processor configured to be connected to the transceiver and process the signals transceived with the one or more other stations,
wherein the processor is further configured to:
control the transceiver to transmit, to a responder, a MIMO beamforming setup frame including station identification information of a station participating in the MU-MIMO beamforming training in a MIMO beamforming setup subphase; and
control the transceiver to transmit, to the responder, a Beam Refinement Protocol (BRP) frame in a MU-MIMO beamforming training subphase,
wherein, based on (i) the station identification information being related to the responder and (ii) a Transmitter Address (TA) field and a Receiver Address (RA) field of the BRP frame being identical to a Medium Access Control (MAC) address of the STA, the BRP frame informs, to the responder related to the station identification information, to perform the MU-MIMO beamforming training.

* * * * *